Sept. 29, 1931.  G. B. JACKSON  1,825,401
PROPELLER
Filed July 25, 1929   2 Sheets-Sheet 1
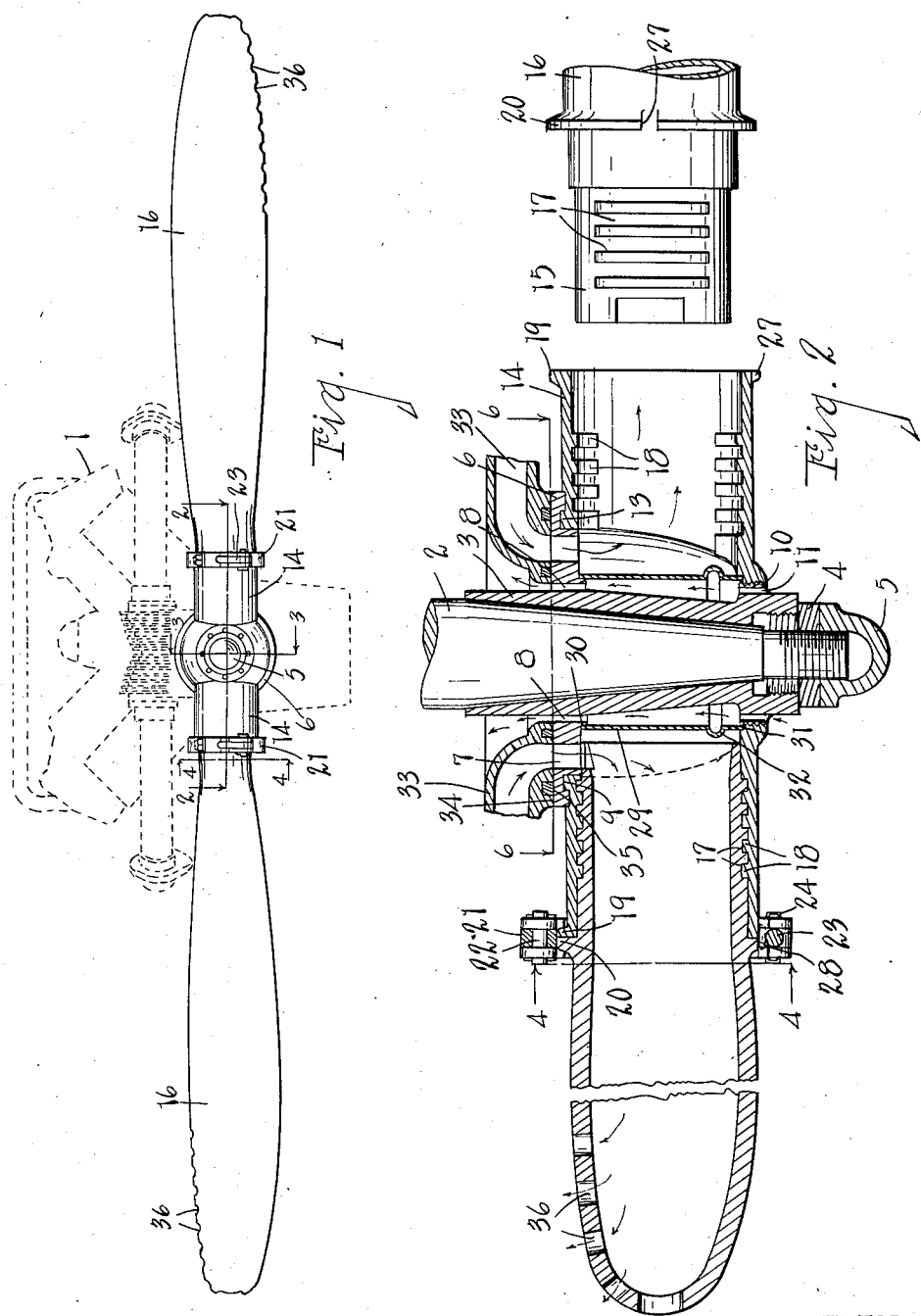
INVENTOR
George B. Jackson
BY Chappell & Earl
ATTORNEYS Sept. 29, 1931. G. B. JACKSON 1,825,401
PROPELLER
Filed July 25, 1929 2 Sheets-Sheet 2
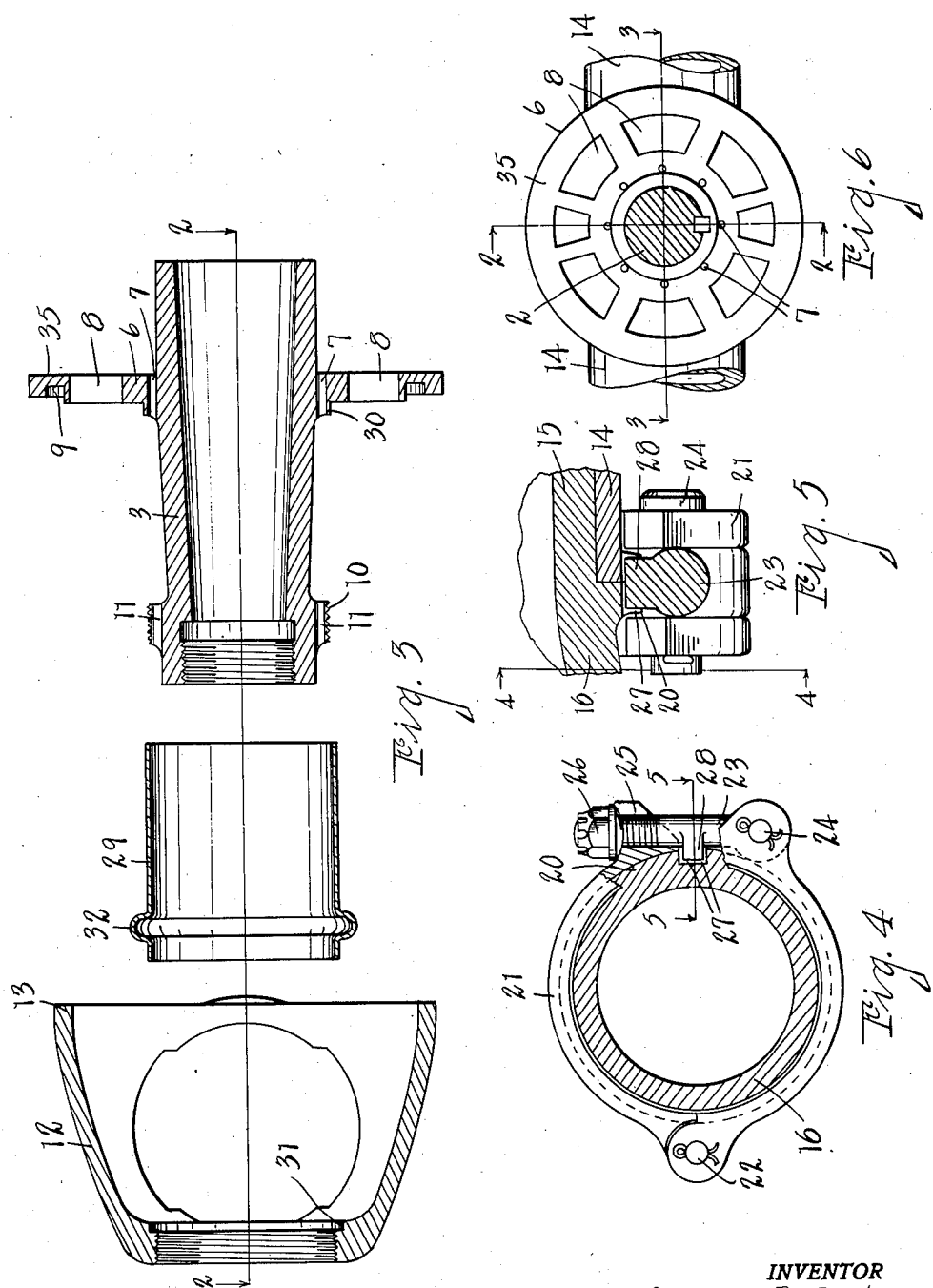
INVENTOR
George B. Jackson
BY Chappell & Earl
ATTORNEYS Patented Sept. 29, 1931

1,825,401

UNITED STATES PATENT OFFICE

GEORGE B. JACKSON, OF THREE RIVERS, MICHIGAN

PROPELLER

Application filed July 25, 1929. Serial No. 380,817.

The main objects of this invention are:

First, to provide a propeller for flying machines by means of which the exhaust is utilized to increase the power of the engine and also discharge with very little noise.

Second, to provide a structure of this type in which the shaft is protected from overheating.

Third, to provide a propeller in which the parts are comparatively simple and economical to produce and very easily assembled and one which is very strong.

Objects relating to details and economies of my invention will appear from the description to follow. The invention is defined and pointed out in the claims.

A structure which is a preferred embodiment of my invention is illustrated in the accompanying drawings, in which:

Fig. 1 is a front elevation of my improved propeller, an engine being shown in operative relation thereto by dotted lines.

Fig. 2 is a fragmentary view mainly in section on a line corresponding to line 2—2 of Figs. 1, 3 and 6.

Fig. 3 is a disassembled central longitudinal sectional view on a line corresponding to line 3—3 of Fig. 6 of the hub, the hub sleeve and the hub sleeve housing.

Fig. 4 is a detail section on a line corresponding to line 4—4 of Figs. 1, 2 and 5.

Fig. 5 is a detail section on line 5—5 of Fig. 4.

Fig. 6 is a detail section on line 6—6 of Fig. 2.

In the embodiment illustrated, 1 represents an internal combustion engine of a flying machine in connection with which I have illustrated my improved propeller.

2 is the propeller shaft which is preferably tapered at its forward end.

The bore of the hub sleeve 3 is tapered to fit upon this tapered portion of the shaft, being clamped thereon by means of the nut 4 threaded upon the end of the shaft and the cap 5 which constitutes a lock nut for the clamping nut 4.

The sleeve 3 is provided with a rear flange 6 having an inner series of openings 8 and an outer series of openings 7, the flange being also provided with a forwardly facing annular groove 9. The sleeve is also provided with a front flange 10 peripherally threaded and having a series of openings 11 therein.

The chambered hub 12 is provided with an annular rib 13 adapted to fit into the groove 9 and is threaded upon the hub sleeve providing when assembled a unitary structure. The hub is also provided with radial tubular arms 14 adapted to receive the ends 15 of the blades 16. These blades are hollow and are provided with segmental transverse grooves 17 adapted to receive the segmental internal lugs 18 in the arms 14, the ends of the blades being inserted and the blades rotated to bring the lugs into engagement. The arms are provided with ribs 19 at the ends thereof while the blades are provided with ribs 20 abutting these ribs 19 when the blades are in engagement with the arms.

Clamping collars 21 formed of sections pivotally connected at 22 embrace these abutting ribs, the collars being provided with clamping bolts 23 connected by the pins 24 to one section to engage slots 25 in the other. Nuts 26 clamp the collars firmly in position. The ribs are provided with notches 27 which are engaged by lugs 28 on the bolts thereby preventing rotative movement of the blades and holding them in engagement with the lugs in the arms.

Within the hub, I mount a sleeve housing 29 preferably of sheet metal, the inner flange 6 of the hub sleeve having a shoulder 30 engaging one end of the sleeve housing while the hub is provided with an internal shoulder 31 engaging the other end of this sleeve housing thereby supporting the sleeve housing in concentric relation to the sleeve and at the outside of the inner series of openings 7 in the rear sleeve flange and the openings 11 in the front sleeve flange, permitting circulation through the sleeve housing.

The housing 29 is preferably provided with an annular bead-like corrugation 32 which permits expansion and contraction of the housing without producing undue pressure on the hub parts or opening the joints between this housing sleeve and the hub parts.

The exhaust manifold 33 is arranged to surround the propeller shaft or a portion thereof, as shown in Fig. 2, and has an annular bearing surface 34 coacting with an annular bearing surface 35 on the rear hub sleeve flange so that the exhaust manifold is in communication with the interior of the hub through the openings 8 and thence to the hollow blades which are provided with discharge openings 36 which are arranged in the rear of the trailing edges of the blades so that the exhaust is discharged at this point with the result that the vacuum is very materially reduced, increasing power and reducing noise.

The parts are comparatively economical, very easily assembled and the resulting structure is strong and rigid.

I have not attempted to illustrate and describe certain embodiments and adaptations which I contemplate as it is believed that this disclosure will enable those skilled in the art to embody or adapt the same as may be desired.

Having thus described my invention, what I claim as new and desire to secure by Letters Patent, is:

1. In a propeller, the combination with a hub sleeve having front and rear flanges, the rear flange being provided with an inner and an outer series of openings and with a forwardly facing annular groove, the front flange having a series of openings and being peripherally threaded, of a chambered hub threaded upon said sleeve and having an annular rib coacting with said annular groove in the rear flange of said sleeve, said hub having tubular arms, hollow blades having discharge openings in their rear edges mounted on said arms, and a sheet metal sleeve housing arranged within said hub, said hub and rear sleeve flange being provided with shoulders engaging the ends of said housing, supporting it in spaced concentric relation to the sleeve at the outside of the inner series of openings in the rear sleeve flange and the openings in the front sleeve flange.

2. In a propeller, the combination with a hub sleeve having front and rear flanges, the rear flange being provided with an inner and outer series of openings and with a forwardly facing annular groove, the front flange having a series of openings and being peripherally threaded, of a chambered hub threaded upon said front flange of said sleeve and having an annular rib coacting with said annular groove in the rear flange of said sleeve, said hub having tubular arms, hollow blades having discharge openings in their rear edges mounted on said arms, and a sleeve housing arranged within said hub in spaced concentric relation to the sleeve at the outside of the inner series of openings in the rear sleeve flange and the openings in the front sleeve flange.

3. In a propeller, the combination with a hub sleeve having front and rear flanges, the rear flange being provided with an inner and outer series of openings and with a forwardly facing annular groove, the front flange having a series of openings and being peripherally threaded, of a chambered hub threaded upon said sleeve and having an annular rib coacting with the annular groove in the rear flange of the sleeve, a sheet metal sleeve housing arranged within said hub, said hub and rear sleeve flange being provided with shoulders engaging the ends of said housing, supporting it in spaced concentric relation to the sleeve at the outside of the inner series of openings in the rear sleeve flange, said housing having an annular corrugation therein, and hollow blades mounted on said hub in communication with the chamber therein and provided with discharge openings.

4. In a propeller, the combination with a hub sleeve having front and rear flanges, the rear flange being provided with an inner and outer series of openings and with a forwardly facing annular groove, the front flange having a series of openings and being peripherally threaded, a chambered hub threaded upon said sleeve and having an annular rib coacting with the annular groove in the rear flange of the sleeve, a sheet metal sleeve housing arranged within said hub, said hub and rear sleeve flange being provided with shoulders engaging the ends of said housing, supporting it in spaced concentric relation to the sleeve at the outside of the inner series of openings in the rear sleeve flange, and hollow blades mounted on said hub in communication with the chamber therein and provided with discharge openings.

5. In a propeller, the combination with a hub sleeve having front and rear flanges, the rear flange being provided with an inner and outer series of openings, the front flange having a series of openings therein, of a chambered hub mounted on said flanges, a sleeve housing arranged within said hub in spaced concentric relation to the sleeve at the outside of the inner series of openings in the rear sleeve flange and said opening in said front flange, and hollow blades mounted on said hub in communication with the chamber therein and provided with discharge openings.

6. In a propeller, the combination with a hub sleeve having a rear flange provided with inlet openings, of a chambered hub mounted on said sleeve provided with discharge openings, hollow propeller blades having discharge openings mounted on said hub to communicate with the chamber therein, and a sleeve housing arranged within said hub, there being openings to the exterior of the hub at both ends of said housing to permit circulation through the housing independent of the hub chamber.

In witness whereof I have hereunto set my hand.

GEORGE B. JACKSON.